United States Patent Office 3,269,959
Patented August 30, 1966

---

3,269,959
CROSS-LINKED POLYMERS FROM FLUORINATED HETEROCYCLIC COMPOUNDS AND GUANIDINE CARBONATES OR PHOSPHORUS OXYTRIAMIDE
Ehrenfried H. Kober and Rudi F. W. Rätz, Hamden, and Henri Ulrich, New Haven, Conn., assignors to Olin Mathieson Chemical Corporation, a corporation of Virginia
No Drawing. Filed Sept. 12, 1960, Ser. No. 55,121
4 Claims. (Cl. 260—2)

This invention relates to novel, high temperature resistant polymers and to a method for their preparation. More particularly, this invention relates to valuable polymers prepared from fluorinated heterocyclic compounds.

The fluorinated heterocyclic derivatives utilized in preparing the useful polymers of this invention can be formed by the process described and claimed in the Kober, Rätz and Ulrich application Serial Number 55,119, filed September 12, 1960, now U.S. Pat. 3,041,346. For example, 2-amino-5-imino-3,3,4,4-tetrafluoro-1-pyrroline can be prepared by reacting ammonia with 2,5,5-trichloro-3,3,4,4-tetrafluoro-1-pyrroline.

It has been found that compounds of the formula:

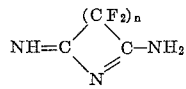

homopolymerize readily on heating at elevated temperatures to form hard polymers and, in addition, these same heterocyclic compounds copolymerize with polyhaloalkylamidines to yield elastic compositions. Cross-linked polymers can also be prepared by polymerizing the described fluorinated heterocyclic compounds in the presence of aliphatic or aromatic bis-amidines or other suitable polyfunctional compounds. In like manner, valuable cross-linked compositions can be prepared by the polymerization of the same fluorinated heterocyclic derivatives with a polyhaloalkylamidine in the presence of a suitable cross-linking agent.

The polymers produced by the process of this invention all have excellent heat resistance and many other useful properties. They are extremely resistant to the action of solvents. The products of this invention can vary from soft polymeric materials of considerable elasticity to hard compositions. These valuable polymers are useful for the preparation of a wide variety of products such as pipes for transporting corrosive fluids. In addition, the polymers of this invention can also be incorporated into phenol-formaldehyde plastics to increase the high temperature stability and solvent resistance of such products. The soft, thermoplastic polymers of this invention are especially valuable as sealants where a very high degree of solvent resistance is required.

HOMOPOLYMERIZATION

Homopolymerization of the fluorinated heterocyclic derivatives useful as starting materials in this invention can be conveniently accomplished by heating the particular compound at an elevated temperature thus causing a condensation reaction to take place which is accompanied by the evolution of ammonia. Although the exact structure of the linear polymers so formed is not known, one postulated mechanism of the condensation reaction may be represented by the following equation:

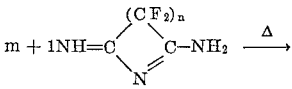

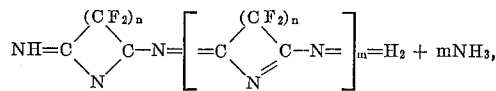

wherein $n$ is an integer of from 2 to 4. The value of $m$ has not been determined since molecular weight measurements have not been made. The homopolymers so formed are assumed to consist of fluorinated heterocyclic rings which are connected through $-N=$ bridges as shown in the above equation. These polymers contain essentially only the elements carbon, nitrogen, and fluorine and are, therefore, extremely heat stable. In general, the homopolymerization reaction will be carried out at temperatures between about 160° C. and about 450° C. with the preferred temperature being from about 200° C. to 400° C. Reaction times commonly range from about 0.5 to 10 hours or more.

COPOLYMERIZATION

Copolymers of 2-amino-5-imino-3,3,4,4-tetrafluoro-1-pyrroline and 2-amino-6-imino-3,3,4,4,5,5-hexafluoro-1-piperideine can also be prepared by heating these two materials together in the manner described above for the preparation of the homopolymers.

Further, it has been found that polyhaloalkylamidines can be co-polymerized with fluorinated heterocyclic compounds to yield polymer structures having elastomeric properties. Their remarkable resistance to high temperatures makes these elastomeric polymers especially valuable and distinguishes them favorably from the vast majority of other known polymers. The co-polymers so produced can withstand temperatures up to 375° C. for an unlimited time without losing their elastic properties even at these elevated temperatures. In addition, since these elastomeric polymers are composed essentially only of carbon, nitrogen and fluorine, they are useful as flame retardant materials. Although the structural formula of the co-polymers so formed is not known, the linear copolymers of this invention are formed by a condensation reaction. One postulated mechanism of the reaction is represented by the following equation in which, by way of illustration, equimolar quantities of the two reactants are employed.

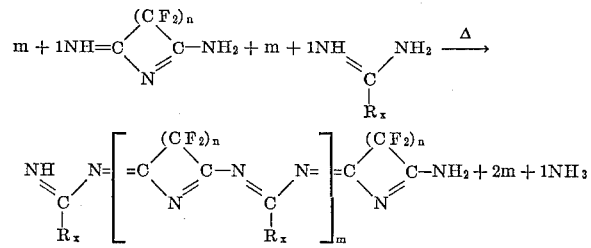

wherein $n$ is an integer 2 or 4 and $R_x$ is a polyhaloalkyl radical. The value of $m$ has not been determined.

Polyhaloalkylamidines suitable as starting materials include those having 2 to 10 carbon atoms in the alkyl group as exemplified by trifluoroacetoamidine, heptafluorobutyroamidine, pentadecafluorocapryloamidine, nonadecafluorocapramidine, and the corresponding chlorine and bromine derivatives. Polychloro- and polybromoalkylamidines may be prepared by first reacting an alkyl nitrile with an alcohol in the presence of hydrochloric acid to form the imido alkyl ether. Further reaction of the imido alkyl ether with liquid ammonia yields the desired polychloro- or polybromoalkylamidine. The preparation of the polyfluoroalkylamidines is somewhat simpler in that they can be made by direct reaction of the polyfluoroalkylinitriles with liquid ammonia at low temperatures.

In preparing the novel copolymers of this invention the reaction temperature may be varied widely from about 160° C. to 450° C. with the preferred reaction temperature being from about 200° C. to about 400° C. Generally the reaction time will vary from about 0.5 to 20 hours or more. The course of the co-polymerization reaction can be easily followed by measuring the evolution of ammonia. Although the novel copolymers of this invention can be conveniently prepared by the condensation of the fluorinated heterocyclic starting materials with a polyhaloalkylamidine in approximately equal molar proportions, the quantity of polyhaloalkylamidine utilized can be varied widely, if desired, from about 0.1 to 2.0 moles or more per mole of fluorinated heterocyclic starting compound empoyed.

CROSS-LINKED POLYMERS

Cross-linking of the polymers of this invention can be achieved by the addition of aliphatic or aromatic bis-amidines. Useful cross-linking compounds of the aliphatic bis-amidine series include (a) difluoromalono-bis-amidine and the corresponding chlorine and bromine derivatives and (b) bis-amidines of the formula:

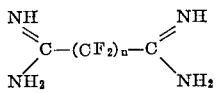

wherein $n$ is an integer of from 4 to 8, as exemplified by octafluoroadipo-bis-amidine, dodecafluorosubero-bis-amidines and hexadecafluorosebaco-bis-amidine. Suitable aromatic bis-amidines include terephthalo-bis-amidine, 2-methylterephthalo - bis-amidine, 3-isopropyl-terephthalo-bis-amidine, etc. The aliphatic and aromatic bis-amidines can be prepared in the manner previously described for the polyhaloalkylamidines except that the aromatic or aliphatic bis-nitriles are used as starting materials rather than the nitriles. Other polyfunctional compounds which are useful as cross-linking agents include guanidine salts, such as guanidine carbonate, aminoguanidine carbonate, and diaminoguanidine carbonate, of the formula:

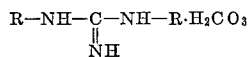

wherein R is selected from the group consisting of hydrogen and amino groups, phosphorus oxytriamide, etc. The use of the cross-linking agents described results in the formation of polymers which exhibit the same or only slightly less thermal stability than the linear polymyers of this invention and, in addition, such cross-linking agents modify other properties favorably.

Although the structural formula has not been definitely established, the cross-linked polymers of this invention are prepared by a condensation reaction for which one postulated mechanism is set forth in the following equation. By way of illustration, difluoromalono-bis-amidine is shown as the cross-linking agent.

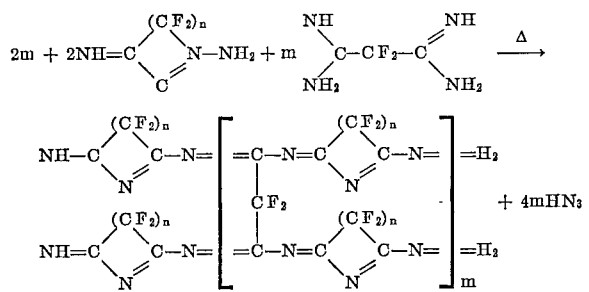

wherein $n$ is an integer of from 2 to 4. The value of $m$ has not been determined. When the compounds guanidine carbonate, aminoguanidine carbonate, and diaminoguanidine carbonate are utilized as cross-linking agents, the carbonic acid portion is eliminated from the reaction mixture as carbon dioxide and water.

In general, the amount of cross-linking agent added will vary from about 5 to about 20 mole percent based on the total number of moles of starting materials in the reaction mixture.

The following examples illustrate the various specific embodiments of this invention and are not to be considered as limitative.

Example I

An amount of 11.37 grams of 2-amino-6-imino-3,3,4,4,5,5-hexafluoro-1-piperideine was heated in an open flask. The temperature was raised from 25° C. to 350° C. within 70 minutes and maintained at 350° C. for an additional 10 minutes. This procedure gave 8.64 grams of a hard polymer which did not decompose upon heating at 350–375° C. for several hours.

Example II

An amount of 0.5 gram of 2-amino-5-imino-3,3,4,4,tetrafluoro-1-pyrroline was heated in an open flask from 25° to 350° C. within 80 minutes and maintained at 350° C. for an additional two hour period. A total of 0.3 gram of a tan-colored polymer was obtained which, after being heated at a temperature of 400° C. for several hours, was not decomposed. Only heating with an open flame caused discoloration of this polymeric material.

Example III

A mixture of 2-amino-5-imino-3,3,4,4-tetrafluoro-1-pyrroline (0.84 gram–0.005 mole) and heptafluorobutyroamidine (1.6 grams–0.007 mole) was heated to 375° C. in a vacuum sublimation apparatus at normal pressure within 80 minutes. A small amount of heptafluorobutyroamidine which condensed on the condenser was removed after the condensation reaction was completed. The obtained polymer was then maintained at 250° C. under a pressure of 1 mm. Hg for one hour. This procedure resulted in the formation of 0.5 gram of a soft, brown-colored, thermoplastic resin.

Example IV

A mixture of 2-amino-6-imino-3,3,4,4,5,5-hexafluoro-1-piperideine (2.19 grams–0.010 mole) and heptafluorobutyroamidine (3.17 grams–0.015 mole) was heated to a temperature of 350° C. within 70 minutes in a so-called "cold finger sublimation apparatus." During the heating period excess amidine was condensed at the condenser (cold finger) and removed. The resulting soft, elastic material was cured by heating at 350° C. for 16 hours and 2.8 grams of an amber-colored polymeric material with elastic properties was obtained. This material retained its elasticity even after extended heating at temperatures between 350° C. and 375° C.

Example V

A mixture of 2-amino-6-imino-3,3,4,4,5,5-hexafluoro-1-piperideine (2.19 grams–0.01 mole) and heptafluorobutyroamidine (3.17 grams–0.015 mole) was heated to a temperature of 350° C. within 84 minutes in the sublimation apparatus described in Example IV. Excess amidine was condensed at the condenser during the heating period. After removal of the excess amidine, the obtained elastic material was cured at 400° C. for 10 minutes and 1.7 grams of a brown-colored, polymeric material with elastic properties was recovered. This material retained its elasticity even at temperatures between 350° C. and 375° C.

Example VI

A mixture of equimolecular amounts of 2-amino-6-imino - 3,3,4,4,5,5 - hexafluoro-1-piperideine (2.19 grams–0.010 mole) and pentadecafluorocapryloamidine (4.12 grams–0.010 mole) was heated in a vacuum sublimation apparatus at atmospheric pressure to 350° C. within 70 minutes. A small amount of the pentadecafluorocapryloamidine was condensed on the condenser (cold finger) and removed after the condensation reaction was completed. Further heating of the polymer, at 350° C. for 16 hours resulted in the recovery of 4.0 grams of a soft, amber-colored polymeric product which exhibited considerable elasticity.

*Example VII*

A mixture of 2-amino-6-imino-3,3,4,4,5,5-hexafluoro-1-piperideine (2.19 grams–0.01 mole) and pentadecafluorocapryloamidine (2.06 grams–0.005 mole) was heated in a vacuum sublimation apparatus at atmospheric pressure to 350° C. within 80 minutes. A small amount of perfluorocapryloamidine which condensed on the condenser was removed after the condensation reaction was completed. The obtained polymer was cured at 400° C. for 10 minutes, resulting in 2.92 grams of an elastic polymer of slightly brownish color.

*Example VIII*

A mixture of 2-amino-6-imino-3,3,4,4,5,5-hexafluoro-1-piperideine (2.19 grams–0.01 mole), heptafluorobutyroamidine (3.16 grams–0.015 mole), and difluoromalonobis-amidine (0.25 gram–0.003 mole) was heated in a vacuum sublimation apparatus at atmospheric pressure to a temperature of 350° C. within 70 minutes. A small amount of volatile products which condensed on the condenser was removed after the condensation reaction was completed. The resulting cross-linked polymer was cured by heating at a temperature of 350° C. for 15 hours, and a total of 1.8 grams of a slightly brownish, soft, elastic polymeric material was obtained.

*Example IX*

A mixture of 2-amino-6-imino-3,3,4,4,5,5-hexafluoro-1-piperideine (2.19 grams–0.01 mole), heptafluorobutyroamidine (3.16 grams–0.015 mole), and difluoromalonobis-amidine (0.25 gram–0.003 mole) was heated as described in Example VIII except that the curing of the polymer was carried out by heating the initial product at a temperature of 400° C. for 10 minutes. An amount of 2.7 grams of a slightly brownish, soft, elastic, cross-linked, polymeric material was recovered.

*Example X*

A mixture of 2-amino-6-imino-3,3,4,4,5,5-hexafluoro-1-piperideine (2.19 grams–0.01 mole) and guanidine carbonate (0.095 gram–0.001 mole) was heated in an open flask to 350° C. within 80 minutes. This procedure gave 1.7 grams of a hard, cross-linked polymer which did not decompose on heating at 350°–375° C. for several hours.

*Example XI*

A mixture of 2-amino-6-imino-3,3,4,4,5,5-hexafluoro-1-piperideine (2.19 grams–0.01 mole) and phosphorus oxytriamide (0.121 gram–0.001 mole) was heated in an open flask to a temperature of 350° C. within 70 minutes. This procedure gave 1.75 grams of a hard, brownish-colored polymer which did not decompose on heating at 350°–375° C. for several hours.

What is claimed is:
1. A method for the production of a fluorine-containing, cross-linked polymer which comprises heating a compound of the formula:

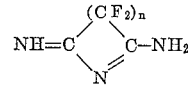

wherein *n* is an integer of from 2 to 3 inclusive, with from about 5 to about 20 mole percent based on the number of moles of the said compound of a cross-linking agent at a temperature of from 160° C. to about 450° C., said cross-linking agent being selected from the group consisting of (A) guanidine compounds of the formula:

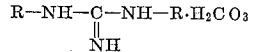

wherein R is selected from the group consisting of hydrogen and amino groups, and (B) phosphorus oxytriamide.

2. The method for the production of a fluorine-containing, cross-linked polymer which comprises heating 2-amino-6-imino-3,3,4,4,5,5-hexafluoro-1-piperideine with from about 5 to about 20 mole percent of guanidine carbonate based on the number of moles of the 2-amino-6-imino-3,3,4,4,5,5-hexafluoro-1-piperideine, at a temperature of from about 160° C. to about 450° C.

3. The method for the production of a fluorine-containing, cross-linked polymer which comprises heating 2-amino-6-imino-3,3,4,4,5,5-hexafluoro-1-piperideine with from about 5 to about 20 mole percent of phosphorus oxytriamide based on the number of moles of 2-amino-6-imino-3,3,4,4,5,5-hexafluoro-1-piperideine, at a temperature of from about 160° C. to about 450° C.

4. The cross-linked polymer produced by the method of claim 1.

References Cited by the Examiner

UNITED STATES PATENTS 2,810,726  10/1957  Howard _____ 260—296

OTHER REFERENCES

Brown: "Conference on High Temperature Polymer and Fluid Research," WADC Technical Report 59–427, reproduced by the Armed Services Technical Information Agency, Arlington Hall Station, Arlington 12, Virginia, pp. 155–160 (January 1960) (available to the public April 6, 1960) (copy available in Division 60).

SAMUEL H. BLECH, *Primary Examiner.*

MILTON STERMAN, LOUISE P. QUAST, WILLIAM H. SHORT, *Examiners.*

J. T. BROWN, P. H. HELLER, H. D. ANDERSON,
*Assistant Examiners.*